United States Patent
Lee

(10) Patent No.: US 8,072,178 B2
(45) Date of Patent: Dec. 6, 2011

(54) IMAGE FORMING APPARATUS AND METHOD

(75) Inventor: Byoung Il Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 700 days.

(21) Appl. No.: 12/046,706

(22) Filed: Mar. 12, 2008

(65) Prior Publication Data

US 2008/0238353 A1    Oct. 2, 2008

(30) Foreign Application Priority Data

Mar. 29, 2007 (KR) .................... 10-2007-0031037

(51) Int. Cl.
*H02P 8/00* (2006.01)
(52) U.S. Cl. ........................ 318/696; 318/685
(58) Field of Classification Search .................. 318/685, 318/696

See application file for complete search history.

(56) References Cited

U.S. PATENT DOCUMENTS

| 4,988,938 | A | * | 1/1991 | Ito et al. ................. 318/696 |
| 5,927,398 | A | * | 7/1999 | Maciulewicz ............. 165/209 |
| 6,750,627 | B2 | * | 6/2004 | Holdaway ................. 318/696 |
| 2002/0008490 | A1 | * | 1/2002 | Holdaway ................. 318/696 |

FOREIGN PATENT DOCUMENTS

| JP | 10-098898 | 4/1998 |
| KR | 2000-34873 | 6/2000 |

* cited by examiner

*Primary Examiner* — Rina Duda
(74) *Attorney, Agent, or Firm* — Staas & Halsey LLP

(57) ABSTRACT

An image forming apparatus including a stepper motor, a component attached to the stepper motor, and a controller to control the stepper motor. The controller controls the stepper motor to be accelerated or decelerated, at driving frequencies that do not match a resonant frequency, in order to avoid a resonance between the stepper motor and the component, by selecting a speed control table that has the driving frequencies, which avoid the resonance. Thus, the image forming apparatus can avoid the resonance between the stepper motor and the component, minimize vibration and noise, and prevent malfunctions of the component. The image forming apparatus further comprises a first storage unit to store a resonant frequency of the component and, a second storage unit to store speed control tables having different driving frequencies, which are set according to speed control periods.

14 Claims, 6 Drawing Sheets

FIG. 3

| NAME OF SPEED CONTROL TABLE | ACCELERATION PERIOD | | CONSTANT SPEED PERIOD | DECELERATION PERIOD | | |
|---|---|---|---|---|---|---|
| FIRST SPEED CONTROL TABLE | f 1-1 | f 2-1 | f 3-1 | f 4-1 | f 5-1 | (Full step) |
| SECOND SPEED CONTROL TABLE | f 1-1 | f 2-2 | f 3-2 | f 4-2 | f 5-2 | (Half step) |
| ⋮ | | | ⋮ | | | |
| N-TH SPEED CONTROL TABLE | f 1-n | f 2-n | f 3-n | f 4-n | f 5-n | (Micro step) ex 1/4, 1/8 |

IMAGE FORMING APPARATUS AND METHOD

CROSS-REFERENCE TO RELATED APPLICATION

This application claims the benefit of Korean Application No. 2007-31037, filed Mar. 29, 2007, in the Korean Intellectual Property Office, the disclosure of which is incorporated herein by reference.

BACKGROUND OF THE INVENTION

1. Field of the Invention

Aspects of the present invention relate to an image forming apparatus and a method of driving the same. More particularly, aspects of the present invention relate to an image forming apparatus capable of reducing the vibration of a stepper motor mounted therein.

2. Description of the Related Art

In general, stepper motors are motors that consistently rotate, according to an input DC voltage, or an input AC voltage. A stepper motor is a brushless, synchronous, electric motor that can divide a full rotation into a large number of steps. When commutated electronically, the motor's position can be controlled precisely, without any feedback mechanism.

This stepper motors are used in image forming apparatuses, such as, a printer, a facsimile machine, a multi-functional apparatus, etc., because of they can be precisely controlled.

However, using a stepper motor can result in the production of a resonance that occurs when a driving frequency of the stepper motor matches a resonant frequency of a part of an image forming apparatus to which the stepper motor is attached. In other words, when mechanical and electrical properties of the stepper motor reach a certain driving frequency band, the stepper motor suddenly vibrates, or experiences a reduction in output torque. In an image forming apparatus, the resonance causes vibration and noise, and reduces the performance and life span of the image forming apparatus.

SUMMARY OF THE INVENTION

Accordingly, it is an aspect of the present invention to provide an image forming apparatus, capable of preventing a resonance between a stepper motor and a component of the image forming apparatus, to which the stepper motor is attached, in consideration of a resonant frequency of the component.

The foregoing and/or other aspects of the present invention are achieved by providing an image forming apparatus having a stepper motor, which comprises: a first storage unit to store a resonant frequency of a component to which the stepper motor is attached; a second storage unit to store a plurality of speed control tables, in which different driving frequencies are set, according to speed control periods; and a controller to control the operation of the stepper motor, using the speed control tables. The driving frequencies are frequencies at which resonance can be avoided, with respect to a resonant frequency of the stepper motor, when the stepper motor is driven.

According to an aspect of the present invention, the component may include a laser scanning unit.

According to an aspect of the present invention, the component may include a scan unit.

According to an aspect of the present invention, the plurality of speed control tables may include a speed control table that includes driving frequencies having a number of pulses, and an interval between the pulses, based on a full step mode.

According to an aspect of the present invention, the plurality of speed control tables may include a speed control table that includes driving frequencies having a number of pulses, and an interval between the pulses, based on a half step mode.

According to an aspect of the present invention, the plurality of speed control tables may include driving frequencies excluding the resonant frequency of the stepper motor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which:

FIG. 3 is a table illustrating driving frequencies, according to speed control periods of speed control tables;

DETAILED DESCRIPTION OF THE EMBODIMENTS

Figure 1:
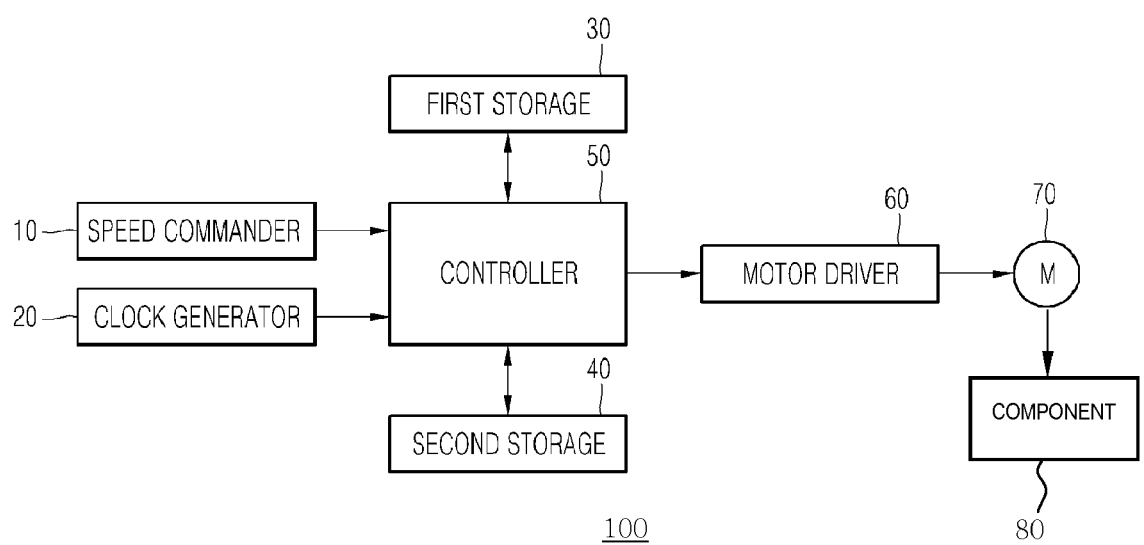
FIG. 1 is a control block diagram of an image forming apparatus, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a control block diagram of an image forming apparatus 100, according to an exemplary embodiment of the present invention. Referring to FIG. 1, the image forming apparatus 100 comprises a speed commander 10, a clock generator 20, a first storage unit 30, a second storage unit 40, a controller 50, a motor driver 60, a stepper motor 70, and a component 80.

Figure 2:
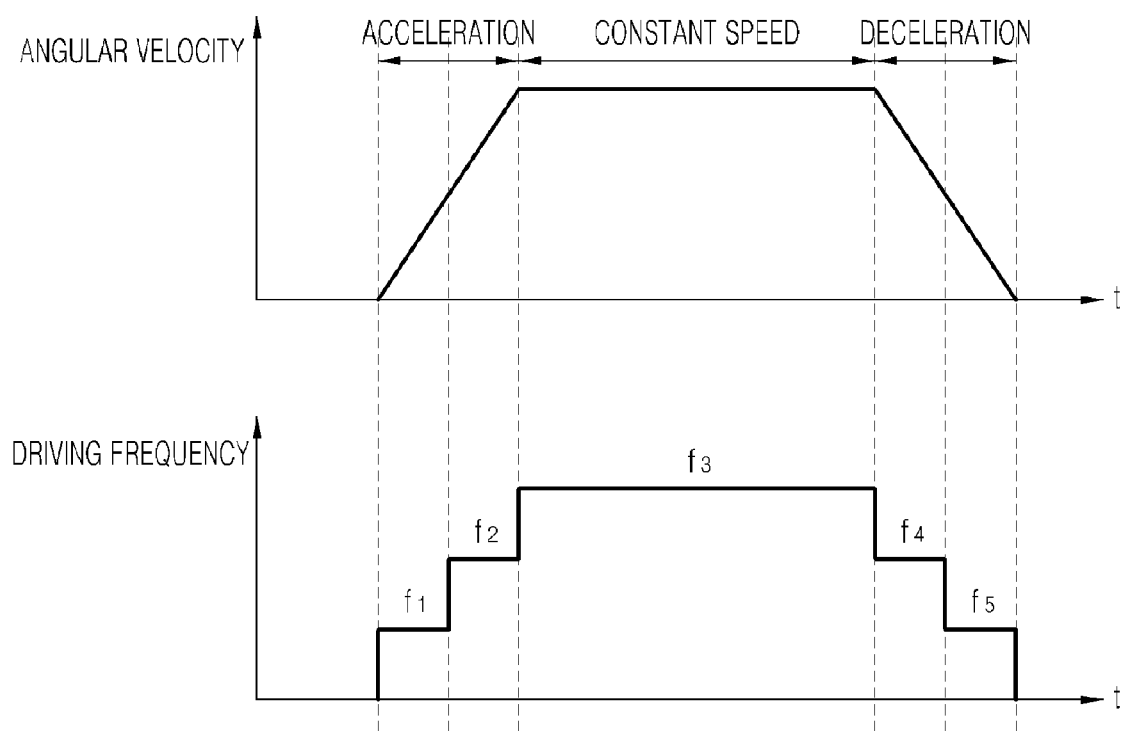
FIG. 2 is a graph illustrating an angular velocity and a driving frequency of the stepper motor of FIG. 1.

The stepper motor 70 is attached to the component 80, and can drive the component 80. The component 80 can be a variety of components of the image forming apparatus 100, for instance, a scan unit, or a laser scanning unit. As illustrated in FIG. 2, when the stepper motor 70 drives the component 80 (scan unit) linearly in a first direction, for example, by rotating in a clockwise direction. The rotation of the stepper motor 70 is divided into speed control periods. The speed control periods include an acceleration period where the speed of the stepper motor 70 is increased, a constant speed control period where the speed of the stepper motor 70 is maintained, and a deceleration period, where the speed of the stepper motor 70 is decreased.

The speed commander 10 determines motion conditions of the stepper motor 70, according to, for example a driving condition for moving the scan unit, and a driving condition for returning the scan unit to a position. The clock generator 20 outputs a reference clock signal, which includes pulses corresponding to driving frequencies of the stepper motor 70, according to the speed control periods. The driving frequencies relate to rotations of the stepper motor 70.

The first storage unit 30 stores resonant frequencies of the component 80 to which the stepper motor 70 is attached The second storage unit 40 stores a plurality of speed control tables, in which different driving frequencies are set, according to each of the speed control periods.

As illustrated in FIG. 3, each speed control table stores the driving frequencies, which are set according to each of the speed control periods (the acceleration period, constant speed period, and deceleration period). The driving frequencies can be varied by a full step, a half step, and a micro step. The full step uses an entire reference clock signal, i.e. one pulse, and thus, the stepper motor 70 rotates by one step, for each pulse. The half step uses only half of one pulse, and thus, the stepper motor 70 rotates by one step when two pulses are input. The micro step can refer to, for example, a ¼ micro step, a ⅛ micro step, and so on. The ¼ micro step uses only ¼ of one pulse, and thus the stepper motor 70 rotates by one step when four pulses are input. The ⅛ micro step uses only ⅛ of one pulse, and thus, the stepper motor 70 rotates by one step when eight pulses are input. The respective driving frequencies exclude a resonant frequency of the stepper motor 70.

The controller 50 outputs the driving frequencies, with respect to the speed control periods, using the speed control tables stored in the second storage unit 40, on the basis of the determination made by the speed commander 10, and drives the stepper motor 70 using the motor driver 60. The controller 50 adjusts the number of pulses and a pulse interval between the pulses, on the basis of the reference clock signal, so as to adjust the driving frequencies, according to the speed control periods. A shorter pulse interval relates to a faster rotation of the stepper motor 70. A longer pulse interval relates to a slower rotation of the stepper motor 70.

As described above, the stepper motor 70 can be precisely controlled. However, at certain speeds the stepper motor 70 can produce a resonance. The resonance can result in unwanted vibration and reduced torque in the stepper motor 70. The resonance occurs when the driving frequency of the stepper motor 70 matches the resonant frequency of the component 80. The resonant frequency of the component 80 is stored in the first storage unit 30. The resonance can result in vibration and noise, and can reduce the performance and life span of the component 80.

Figure 4:
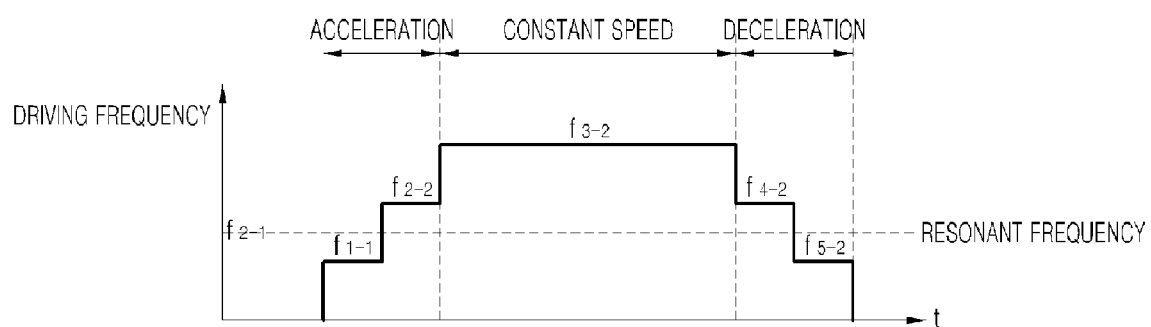
FIG. 4 is a graph illustrating a modification of a speed control table, to avoiding resonance.
Figure 5:
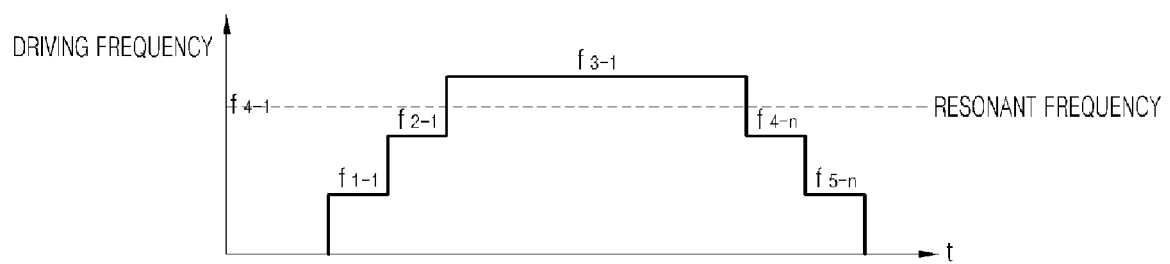
FIG. 5 is a graph illustrating another modification of a speed control table, to avoiding resonance.

As illustrated in FIGS. 4 and 5, if the resonance is produced, when controlling the stepper motor 70 using a particular speed control table, i.e., when the driving frequency of the stepper motor 70 is equal to the resonant frequency, the controller 50 uses a different speed control table, such that the driving frequency does not match the resonant frequency. As a result, the resonance between the stepper motor 70 and the component 80, is avoided.

As illustrated in FIG. 4, when the resonant frequency is f2-1, the controller controls the stepper motor 70 to perform a first acceleration using a driving frequency, f1-1, during a first acceleration period, on the basis of a first speed control table. The first speed control table can be referred to as a reference speed control table. However, because the driving frequency f2-1 is equal to the resonant frequency, the controller switches from the first speed control table to another speed control table (e.g. a second speed control table), to avoid the resonance. Thus, the controller changes the driving frequency f2-1 to another driving frequency, so that the resonance can be avoided.

As illustrated in FIG. 5, when the resonant frequency is f4-1, the controller 50 controls the stepper motor to be accelerated, or to be rotated at a constant speed, using driving frequencies of the acceleration and constant speed control periods, of a first speed control table, during the acceleration and constant speed control periods. However, because the driving frequency f4-1 is equal to the resonant frequency at a deceleration period, the controller changes to another speed control table (e.g. an n-th speed control table) to avoid the resonance. Thus, the controller 50 changes the driving frequency f4-1 to another driving frequency, so that the resonance can be avoided.

Figure 6:
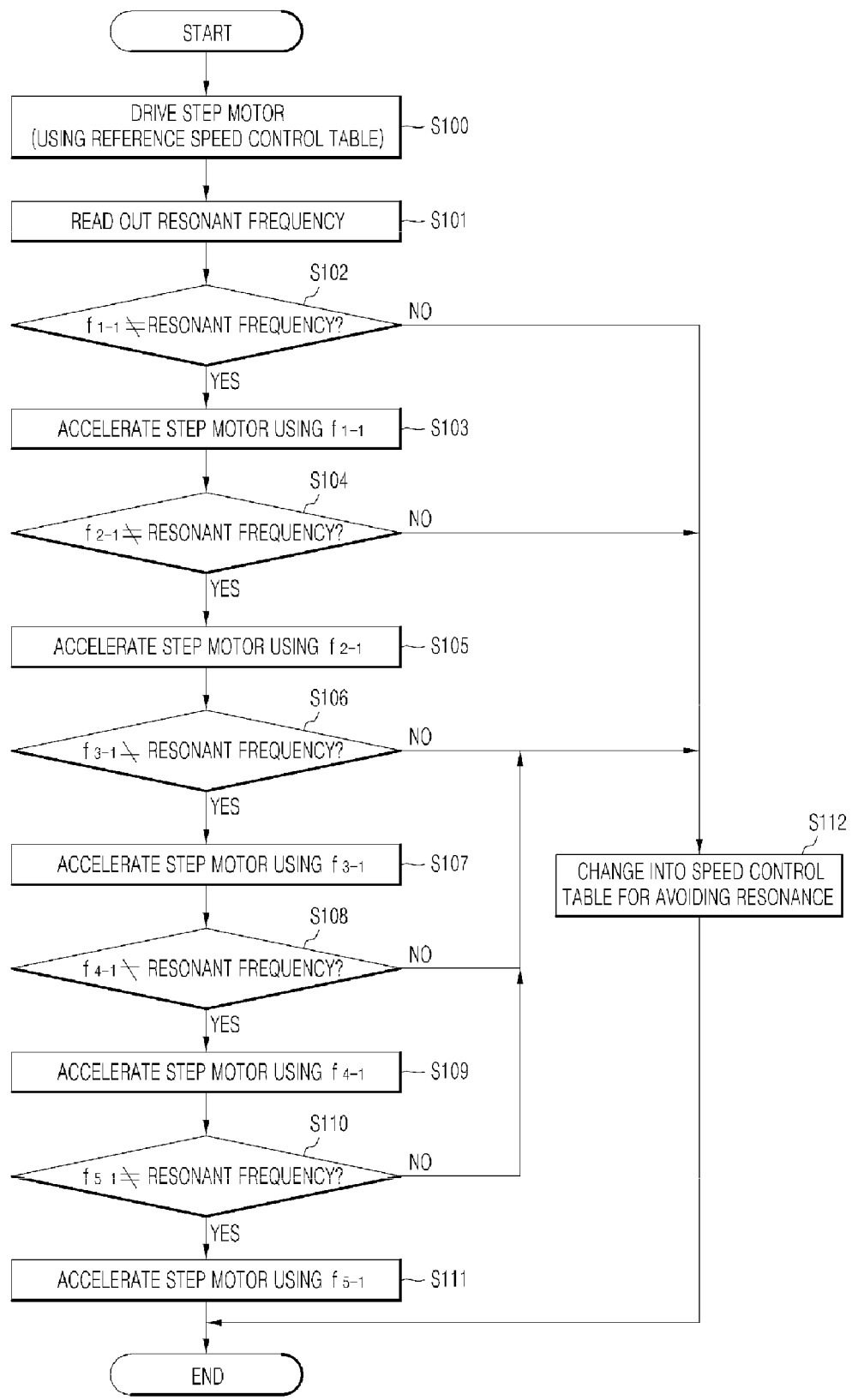
FIG. 6 is a control flowchart illustrating a driving control method of a stepper motor in an image forming apparatus, according to an exemplary embodiment of the present invention.

The operation of the controller 50 will now be described in greater detail, with reference to FIG. 6. First, the controller 50 drives the stepper motor 70 at a driving frequency read from a first speed control table (e.g., the reference speed control table), in operation S100.

In operation S101, the controller reads the resonant frequency stored in the first storage unit 30. In operations S102 through S111, the controller determines whether a driving frequency at a first acceleration period, a second acceleration period, a constant speed period, a first deceleration period, and a second deceleration period, equals the resonant frequency.

If none of the driving frequencies equal the resonant frequency, the controller 50 controls the rotation of the stepper motor 80, during each speed control period, using the driving frequencies of the reference speed control table.

However, if any of the driving frequencies is equal to the resonant frequency, the controller 50 switches from the reference speed control table, to an alternate speed control table, to avoid the resonance. The controller 50 controls the stepper motor to be accelerated, to be rotated at a constant speed, or to be decelerated, during each speed control period, according to the driving frequencies of the alternate speed control table.

According to aspects of the present invention, when the stepper motor 70 is driven, the controller 50 controls the stepper motor to be operated at a driving frequencies that do not match the resonant frequency of the component 80 to which the stepper motor is attached, using the alternate speed control table instead of the reference speed control table. The controller 50 switches to the alternate speed control table, if the reference speed control table has driving frequencies expected to cause the resonance. Thereby, the image forming apparatus 100 can avoid the resonance between the stepper motor 70 and the component 80, minimize vibration and noise, and a prevent malfunctions and/or a life span reduction of the component 80.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:
1. An image forming apparatus comprising:
   a stepper motor to drive a component;
   a first storage unit to store a resonant frequency of the component;

a second storage unit to store speed control tables having driving frequencies corresponding to speed control periods used during the driving the component; and a controller to control driving frequencies of the stepper motor, by selecting one of the speed control tables that has driving frequencies that do not match the resonant frequency, wherein the controller selects the speed control table by comparing each of the driving frequencies of the selected speed control table to the resonant frequency.

2. The image forming apparatus as claimed in claim 1, wherein the component is a laser scanning unit.

3. The image forming apparatus as claimed in claim 1, wherein the component is a scan unit.

4. The image forming apparatus as claimed in claim 1, wherein one of the speed control tables comprises driving frequencies having a number of pulses, and an interval between the pulses, based on a full step mode.

5. The image forming apparatus as claimed in claim 1, wherein one of the speed control tables comprises driving frequencies having a number of pulses, and an interval between the pulses, based on a half step mode.

6. The image forming apparatus as claimed in claim 1, wherein one of the speed control tables comprises driving frequencies having a number of pulses, and an interval between the pulses, based on a full step mode.

7. The image forming apparatus as claimed in claim 1, wherein the second storage unit does not store a resonant frequency of the stepper motor.

8. The image forming apparatus as claimed in claim 1, wherein the speed control periods comprise an acceleration period, a constant speed period, and a deceleration period.

9. The image forming apparatus as claimed in claim 1, wherein a plurality of the driving frequencies correspond to each of the speed control periods.

10. A method of driving a component of an image forming apparatus, using a stepper motor, the method comprising:
    operating the stepper motor to drive the component, according to a reference speed control table that comprises first driving frequencies corresponding to speed control periods used to drive the component;
    comparing each of the driving frequencies of the selected speed control table to the resonant frequency; and
    operating the stepper motor according to a second speed control table, which comprises second driving frequencies corresponding to the speed control periods, if any of the compared driving frequencies match the resonant frequency.

11. The method of claim 10, wherein the driving frequencies of the second speed control table do not match the resonant frequency.

12. The method of claim 10, wherein the speed control periods comprise an acceleration period, a constant speed period, and a deceleration period.

13. The method of claim 10, wherein the comparing of the driving frequencies comprises comparing each driving frequency to the resonant frequency, before the stepper motor is driven according to each driving frequency.

14. A method of reducing resonance between a scan unit and a stepper motor that drives the scan unit, comprising:
    driving the scan unit with the stepper motor according to first driving frequencies corresponding to speed control periods;
    comparing each of the driving frequencies of the selected speed control table to the resonant frequency; and
    operating the stepper motor according to second driving frequencies corresponding to the speed control periods, if any of the compared driving frequencies match the resonant frequency.

* * * * *